March 22, 1960
C. L. CAMPBELL
2,929,465
INTERNAL PURIFIER
Original Filed July 29, 1955
3 Sheets-Sheet 1
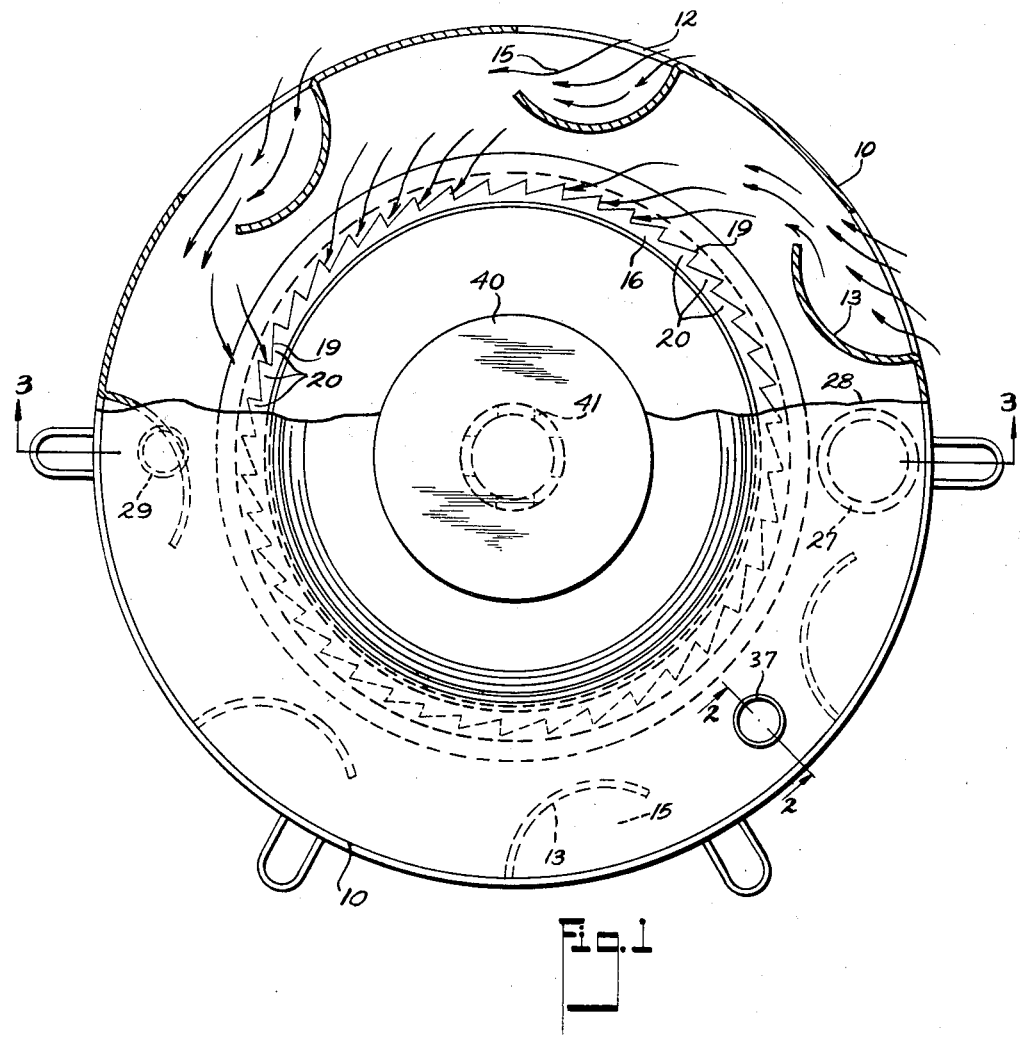
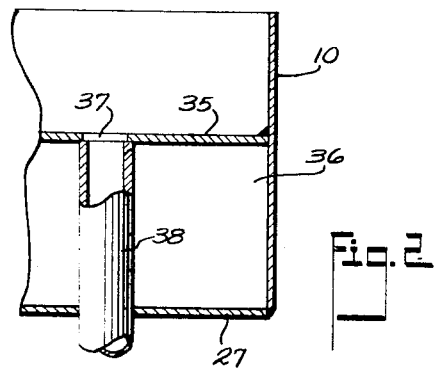
INVENTOR.
CHARLES LANGDON CAMPBELL
BY
WATTS & EDGERTON
ATTORNEYS March 22, 1960 C. L. CAMPBELL 2,929,465
INTERNAL PURIFIER
Original Filed July 29, 1955 3 Sheets-Sheet 2
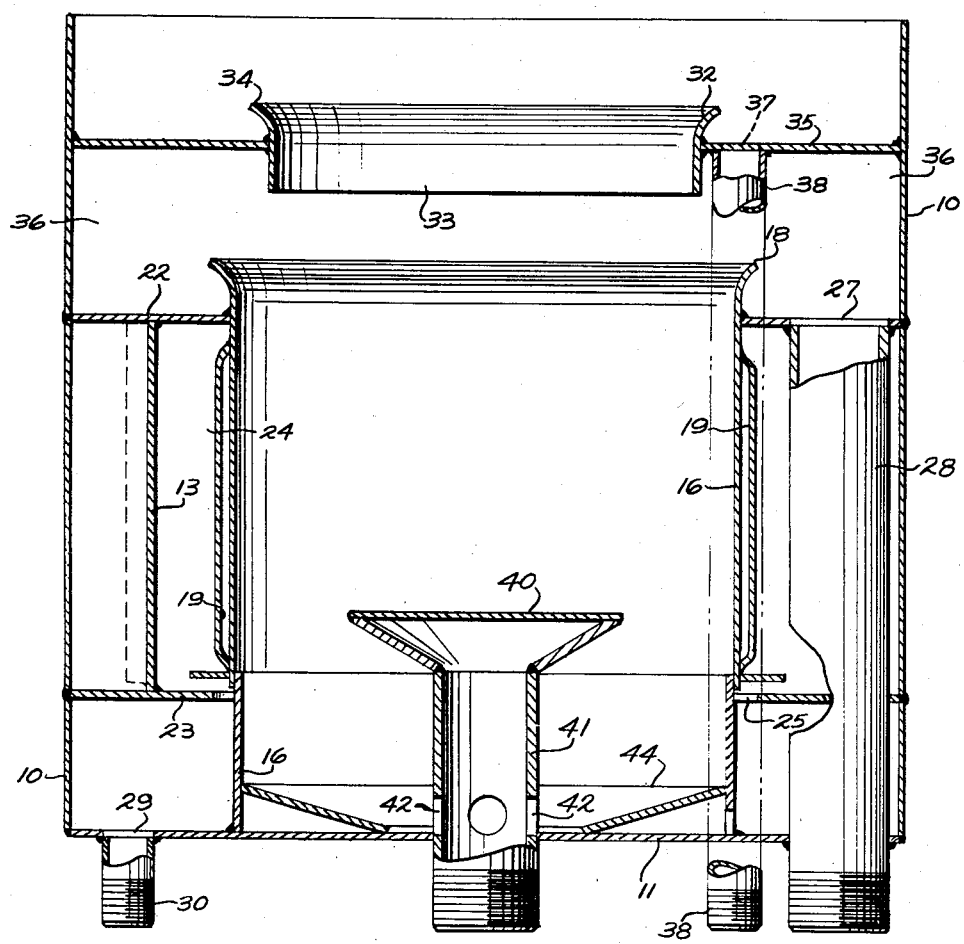
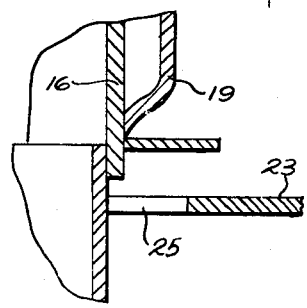
INVENTOR.
CHARLES LANGDON CAMPBELL
BY
WATTS & EDGERTON
ATTORNEYS March 22, 1960     C. L. CAMPBELL     2,929,465
INTERNAL PURIFIER Original Filed July 29, 1955     3 Sheets-Sheet 3

INVENTOR.
CHARLES LANGDON CAMPBELL
BY
WATTS & EDGERTON
ATTORNEYS

United States Patent Office 2,929,465
Patented Mar. 22, 1960

2,929,465

INTERNAL PURIFIER

Charles Langdon Campbell, Painesville, Ohio, assignor to Centrifix Corporation, Columbus, Ohio, a corporation of Ohio Original application July 29, 1955, Serial No. 525,196, now Patent No. 2,864,463, dated December 16, 1958. Divided and this application July 21, 1958, Serial No. 749,859

5 Claims. (Cl. 183—81)

The present invention relates generally to the purification art and is more particularly concerned with novel apparatus for separating liquid and solid entrainment from substances flowing in the gaseous phase such as steam, air, gases and vapors.

There are classical purification problems which have withstood all the efforts devoted over a long period of time to the development of satisfactory solutions. One of these concerns the elimination of salinity from sea water to make it suitable for human consumption and for use in steam generator operation. In theory, sea water can be distilled to produce a condensate which will be sweet and potable, and this result is actually obtained in laboratory-scale operations where close control is exercised. From a practical standpoint, however, it has never heretofore been commercially feasible to carry out a distillation operation on shipboard to meet a substantial proportion of the needs of either the personnel or the ship's boilers. The distillation equipment required for sizable production would be ponderous and expensive to install and operate to the point where it is more economical to carry all the water required. In fact, the almost universal practice until very recently has always been to store water for a voyage rather than to attempt to rely upon sea water processing.

Within the past few years, with the development of the internal purifier, it has begun to appear that the sea water purification problem can be eliminated. Commercial units of this equipment have gone into service in both shore and shipboard installations and have, to a large extent, met and disposed of the difficulties of the prior art devices and have provided abundant supplies of purified water. Nevertheless, these units have not been considered to meet fully the requirements of the more exacting operators and consumers in respect to the purity of the products obtainable. Consequently, to provide acceptable water in a sea water purification operation, in these prior art devices, it would be necessary to use a duplex procedure to extract impurities in two or more stages, depending upon the degree of contamination of the entering solution and the purity or grade of the end product desired. This meant that either capacity would be diminished or the investment would have to be doubled or tripled to provide separating facilities necessary to carry out the duplexing operation.

I have discovered that this prior art internal purifier equipment can be reconstructed to effect the separations necessary in one step to produce the highest quality and purity water products. In accordance with my present invention based on this discovery, I have found that, in full scale operations on shipboard, the equipment of this invention is capable of producing consistently and continuously a condensate having no more than one part per million of dissolved solids. Moreover, this result has been obtained using an entering solution containing 5% by weight of dissolved solids, i.e., approximately 50,000 parts per million. This compares with the best performance of the best previous separator design in which, under the most favorable conditions, a condensate containing about 3 parts per million of dissolved solids is consistently obtained only when the total dissolved solids in the infed water do not exceed about 5,000 parts per million.

As indicated above, this invention has the additional substantial advantage of being applicable to the basic design of the best internal purifiers heretofore known. The changes required in these devices are relatively small so that the manufacturing procedures will require only slight modifications to convert to the production of the devices of this invention.

As another advantage of this invention, it is not necessary to make the prior devices any larger or more massive to adapt them to the application of my present discovery, and their capacity is in no way reduced or adversely affected by the incorporation of the novel features of this invention in them.

In brief, the centrifugal separating apparatus of this invention comprises an outer cylindrical shell open at one end and closed at its other end and having tangential inlet openings of air foil design in its side wall, an inner cylindrical shell disposed in and radially spaced from the outer shell and having an open end and a closed end and tangential inlet openings in its side wall, diaphragm means closing the space between the outer shell and the inner shell to provide an outer separating chamber, and a nozzle disposed between the open ends of the inner and outer shells comprising a cylinder having an outwardly-rolled lip and an inlet portion adjacent to the open end of the inner shell. Additionally, the inner shell is provided with a vortex control feature in the form of a frusto-conical body disposed substantially coaxially of the inner shell with its base directed forward the open end of the said inner shell.

Those skilled in the art will gain a further and better understanding of this invention upon consideration of the detailed description set forth below, reference being had to the drawings accompanying and forming a part of this specification, in which:

Fig. 1 is a top plan view, partly in section, of an internal purifier embodying this invention in a preferred form;

Fig. 2 is a fragmentary, sectional view taken on line 2—2 in Fig. 1;

Fig. 3 is a vertical, sectional view of the device of Fig. 1 taken on line 3—3 thereof;

Fig. 4 is an enlarged, fragmentary view in section of the device of Fig. 1, showing the drain opening through the diaphragm at the lower portion of the primary separating chamber.

Figure 5:
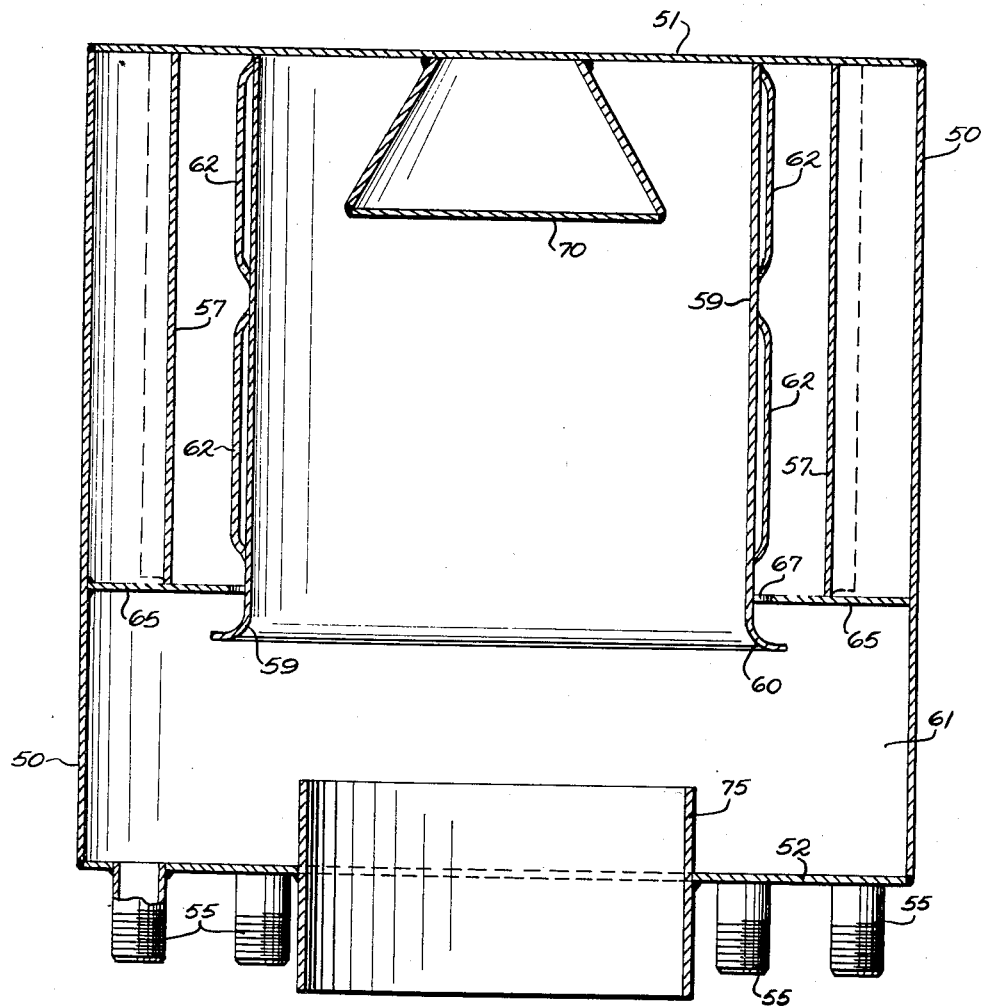
Fig. 5 is a vertical sectional view similar to Fig. 3 of an alternative form of internal purifier of this invention.

As illustrated in these drawings, a centrifugal separating apparatus embodying this invention in general comprises an outer cylindrical shell which is open at one end and closed at the other and which has tangential inlet openings in its side wall. In addition, it includes an inner cylindrical shell disposed in and radially spaced from the outer shell and having one end open and the other closed and having tangential inlet openings in its side wall. Diaphragm means are provided closing the space between the outer shell and the inner shell to provide an outer separating chamber and a nozzle disposed between the open ends of the inner and outer shells. This nozzle comprises a cylinder having an outwardly-rolled lip and an inlet portion adjacent to the open end of the inner shell.

More particularly and with reference to Figs. 1–4, inclusive, a typical device of this invention comprises a cylinder 10 open at the top and closed at the bottom by a floor plate 11. Seven longitudinally-extending, equally-spaced openings 12 are provided in the intermediate portion of the side of the cylinder for the delivery into this apparatus of steam or other gas to be treated and purified. A baffle scoop or curved blade 13 is provided adjacent to each of these openings, being secured to or preferably formed integrally with cylinder 10 and disposed on the upstream side of the respective openings 12. Scoops 13 are formed to define in cross-section (Fig. 1) a segment of a circle or an air foil and are dimensioned and located to define a throat 15 between cylinder 10 and the blade edge of each scoop 13 adjacent to its inlet opening 12.

An inner cylindrical shell 16 is disposed coaxially within shell 10 and is closed at its lower end by plate 11. At its upper end, shell 16 is open and is provided with a curved lip 18 flaring outwardly for the discharge of gases being treated in this apparatus. In its intermediate portion, the inner shell has fifty closely-spaced, tangentially-cut blades 19 and inlet openings 20 for flow of gas from the space between shells 10 and 16 into shell 16 in a counterclockwise direction as indicated in Fig. 1. Blades 19 are approximately the same length as baffle scoops 13 and are opposed to them to facilitate gas flow through the apparatus. Upper and lower diaphragm plates 22 and 23 are disposed horizontally between the upper portions and the lower portions of the inner shell and the opposed portions of the outer shell effectively closing the outer separating space or chamber 24 wherein the baffle scoops and blades 19 are located in order to channel gas flow into the inner shell. An annular opening 25 is provided for drainage from the lower portion of space 24, being defined between plate 23 and inner shell 16. An opening 27 is provided in upper diaphragm plate 22 and a pipe 28 is connected to that plate to receive drainage therefrom and to conduct collected liquid downwardly through space 24, plate 23 and floor plate 11. Drains are also provided to serve the lower portion of the apparatus, an opening 29 in plate 11 serving to permit drainage of condensate through the plate and into a pipe 30.

A nozzle 32 comprising a relatively short cylindrical body having a lower inlet opening 33 disposed coaxially of the inner shell 16 is situated above lip 18 to receive gases flowing upwardly from the inner separating chamber. The upper open end of nozzle 32 is formed with an outwardly-rolled lip 34 similar in form to lip 18. Nozzle 32 has a diameter equivalent to a circular area equivalent to the total open area of the tangential inlet openings so that gases flowing toward the upper end of the apparatus are throttled to some degree in travel into and through the nozzle. A baffle plate 35 is provided to prevent escape of gas around the nozzle, being connected to the upper portion of shell 10 and to nozzle 32 to define in cooperation with shell 10 and upper diaphragm plate 22 a raceway 36 for gases traveling upwardly from the inner shell 16.

As illustrated in Fig. 2, drainage of condensate and particles accumulating on the upper side of baffle 35 is effected by means of a vertically-extending pipe 38 which communicates with the outlet chamber above plate 35 through opening 37.

As those skilled in the art will understand, any suitable, conventional type of equipment may be used in conjunction with this apparatus for the purpose of delivering gas into it through openings 12. Likewise, such conventional apparatus as may be desired can be coupled to this device to receive purified gas emerging through the top of shell 10.

An inverted, hollow, frusto-conical body 40 is supported in the lower portion of inner shell 16 by a drain pipe 41 which extends through an axial opening in floor plate 11. Pipe 41 has a plurality of apertures 42 opening into the bottom of the inner separating chamber at the level of the floor plate 11 for collection and drainage of condensate and associated solids. This drainage is facilitated by the provision of a plate 44 in the lower part of shell 16 which is disposed to define a frusto-conical space, the floor of which slopes downwardly toward pipe 41 from the lower portion of shell 16. The base of body 40 is directed upwardly toward the open end of shell 16 and this base has an outer or upper surface which is substantially flat or monoplanar. Body 40 is so disposed on top of pipe 41 that its base is located well above the bottom of the apparatus and within the part of shell 16 where inlet openings 20 are provided. However, this base is below the horizontal mid-section of shell 16 and its maximum diameter is only approximately one-half the diameter of the inner shell.

In the operation of the apparatus of this invention, the gas, air, vapor or steam to be treated and purified is delivered into the apparatus through openings 12 at relatively high velocity on the order of heretofore conventional practice. As this gas travels through space 24 in a counterclockwise direction, a preliminary separation is made as entrained drops, globules and solids strike against the blades 13 and are either forced downwardly to the bottom of the chamber 24 from which they are drained through opening 25, or are thrown against the back surface of the leading edge portion of the next blade downstream. Gravity plus the forces created by the rotational movement of the gas within outer chamber 24 causes these precipitated liquids to move downwardly along the outside surfaces of baffles 13 for ultimate drainage through openings 29 and 25 and pipe 30. In accordance with the preferred practice, liquids thus accumulated and drained through pipe 30 may be returned to the liquid being evaporated for separation in this apparatus.

The gas entering the inner separating chamber through openings 20 is thrown into a rapidly revolving mass moving in a counterclockwise direction. Any remaining entrained liquids or solids consequently are thrown to the outer periphery of the revolving mass and against the inner side of shell 16. The thus separated or precipitated materials are then either driven downwardly into the lower part of shell 16 and collected on plate 44 and delivered thereby into pipe 41 through openings 42 therein, or are carried upwardly with the revolving mass of gas. As the gas with admixed liquids and solids is discharged into raceway 36, the non-gaseous portion of the mixture is to a large degree collected along the inner side of shell 10 and the underside of plate 35 and drained from the raceway chamber through openings 27 and pipe 28. The remaining fraction of unseparated non-gaseous material associated with the gases traveling upwardly from the inner separating chamber is conducted through nozzle 32 and again centrifuged on emerging over lip 34 with the result that these solids and liquids are caught against the inner surface of the upper part of cylinder 10 and collected and drained through opening 37 in plate 35 by means of pipe 36.

Curved lips 18 and 34 make possible the highly effective and efficient separations characteristic of the apparatus of this invention by preventing re-entrainment of separated liquid components which are held by centrifugal force and surface tension to these curved lips and then flow outwardly to the edge of the lips where they are discharged at an angle to the path of travel of the clean gas being discharged from the separator.

The gas leaving the apparatus through the top of cylinder 10 is substantially free from contamination by liquids and solids. A suitable form of collection device or nozzle means may be provided for receiving this purified gas as those skilled in the art will understand.

The device illustrated in Fig. 5 bears a general resemblance to the device of Fig. 1 and while they both offer the same novel advantages and operational features and embody the same invention, there are certain structural differences between them. This Fig. 5 device comprises a cylinder 50 which is closed at its upper end by top plate 51 and is closed at its lower end by plate 52 having a central opening for the downward discharge of gases from the apparatus.

A plurality of openings of reduced diameter are provided in plate 52 for the discharge of liquid from cylinder 50 and threaded tubes 55 are welded to plate 52 to receive liquids discharged through these openings.

Seven longitudinally-extending, uniformly-spaced openings are provided in the upper side portion of cylinder 50 for the delivery into the apparatus of steam and other gases to be treated and purified. Baffle scoops 57 of shape, form and function similar to scoops 13 of the Fig. 1 device are provided adjacent to these longitudinal openings, being formed integrally with cylinder 50 and disposed on the upstream side of the respective longitudinal openings. The upper ends of these scoops abut the lower side surface of top plate 51 to block gas flow over the upper ends of the scoops.

An inner cylindrical shell 59 is disposed in shell 50 and coaxially thereof, and is secured at its upper end fluid tightly to top plate 51. Shell 59 is open to its lower end which terminates within cylinder 50 in a curved lip 60 flaring outwardly for the discharge of gases into race-way 61. In its intermediate portion the inner shell is provided with two vertically spaced series of tangentially-cut blades 62 and inlet openings for flow of gas from the annular space between shells 50 and 59 into the inner shell in a counterclockwise direction after the manner illustrated in Fig. 1 and described in detail above.

Blades 62 in the aggregate are of length approaching that of the scoops 57 and are disposed with respect of the scoops to facilitate gas flow through the apparatus.

A diaphragm plate 65 is disposed in abutting relation to the lower ends of scoops 57 to effectively close the space between shells 50 and 59 in the zone of the inlet openings so that gas flow is channeled through the openings of shells 50 and 59. Plate 65 is a flat ring which is welded to the inside of cylinder 50 and is substantially horizontally disposed with its inner peripheral portion uniformly spaced from shell 59 to define a small annular gap 67 for drainage of condensate from the inlet chamber defined by cylinder 50, shell 59, top plate 51 and diaphragm plate 65.

A hollow, frusto-conical shell 70 is disposed within shell 59 and coaxially therewith, being secured by welds to top plate 51 so that its base portion is disposed in the upper part of shell 59 to limit the depth of the vortex formed in operation of the device.

A nozzle in the form of a cylindrical shell 75 is provided at lower end of the device, being welded to plate 52 in axial alignment with shell 59. The inner wall of nozzle 75 projects into race-way space 61, while the outer end of the nozzle is disposed below plate 52. The inside diameter of nozzle 75 is substantially less than the inside diameter of shell 59, this relationship being like that between nozzle 32 and shell 16 of the Fig. 1 apparatus.

It will be understood by those skilled in the art that the operation of the Fig. 5 apparatus will be essentially the same as the operation described in detail above, the principal difference being that discharge from the Fig. 5 apparatus is through the lower end rather than the upper end of the vertically disposed separating vessel. It has been found in actual practice that equally effective separations can be made by these two types of devices of this invention. Therefore the operator is afforded a choice to satisfy the special limitations of his equipment and conditions in the use of this invention apparatus.

In reference to the separating effect accomplished in the inner separating chamber, inverted frusto-conical body 40 functions to control the vortex of the revolving mass of gas and associated solids and liquids. By this device, the vortex in this whirling mass is prevented from extending into race-way 36 and nozzle 32 and thereby limiting the available flow area and producing a high pressure drop through the separator unit. By flattening the vortex so that it is entirely contained within the separating chamber, the efficiency of the separation operation is materially increased. At the same time, the pressure drop through the separating apparatus is maintained at a low figure.

This is a division of my co-pending application Serial No. 525,196, filed July 29, 1955, now Patent No. 2,864,463, issued December 16, 1958.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

I claim:

1. Centrifugal separating apparatus comprising an outer cylindrical shell open at one end and closed at the other end and having elongated inlet openings extending axially of said shell, an inner cylindrical shell disposed in the outer shell and defining therewith an outer separating chamber and having an open end and a closed end and elongated inlet openings in its side wall, blades attached to the inner side of said side wall adjacent to said openings and disposed tangentially relative to said wall, a diaphragm means including an upper diaphragm plate disposed between the inner and outer shells, and closing the top of the outer separating chamber and a lower diaphragm plate closing the lower end of the said separating chamber and providing with the inner shell a drainage opening serving the said outer chamber, a plurality of baffle blades disposed in spaced relation to each other in the outer separating chamber and extending the full length of the inlet openings in the outer shell and longitudinally relative to the latter, said blades each serving a separate opening and being secured to the outer shell on the upstream side and along the length of its respective opening and having the other longitudinal edge portion directed toward the outer shell downstream from the said opening and providing a throat through which gases entering the separator must first flow tangentially, and vortex control means comprising a frusto-conical body disposed coaxially in the inner shell with its apex directed toward the closed end of the apparatus, said body having a base with a substantially monoplanar outer surface of diameter approximating one-half the inside diameter of the inner shell and disposed farther from the open end than from the closed end of the inner shell and between the ends of the inlet openings in said inner shell.

2. Centrifugal separating apparatus comprising an outer cylindrical shell open at one end and closed at the other end and having elongated inlet openings extending axially of the shell, an inner cylindrical shell disposed coaxially in the outer shell and spaced radially therefrom and having a closed end and an open end directed toward the open end of the outer shell and having elongated inlet openings in its side wall, blades attached to the inner side of said side wall adjacent to said openings and disposed tangentially relative to said wall and vortex control means comprising a frusto-conical body disposed coaxially in the inner shell with its apex directed toward the closed end of the apparatus, said body having a base with a substantially monoplanar outer surface of diameter approximating one-half the inside diameter of the inner shell and disposed farther from the open end than from the closed end of the inner shell and between the ends of the inlet openings in said inner shell.

3. Centrifugal separating apparatus comprising an outer cylindrical shell open at one end and closed at the other end and having elongated inlet openings extending axially of said shell, an inner cylindrical shell disposed in the outer shell and defining therewith an outer separating chamber and having an open end and a closed end and elongated inlet openings in its side wall, diaphragm means including an upper diaphragm plate disposed between the inner and outer shells, and closing the top of the outer separating chamber and a lower diaphragm plate closing the lower end of the said separating chamber and providing with the inner shell a drainage opening serving the said outer chamber, and a plurality of baffle blades disposed in spaced relation to each other in the outer separating chamber and extending the full length of the inlet openings in the outer shell and tangentially relative to the latter, said blades each serving a separable opening and being secured to the outer shell on the upstream side and along the length of the opening and having the other longitudinal edge portion directed toward the outer shell downstream from the said opening and providing a throat through which gases entering the separator must first flow.

4. Centrifugal separating apparatus comprising an outer cylindrical shell open at one end and closed at the other end and having elongated inlet openings extending axially of said shell, an inner cylindrical shell disposed in the outer shell and defining therewith an outer separating chamber and having an open end and a closed end and elongated inlet openings in its side wall, diaphragm means including an upper diaphragm plate disposed between the inner and outer shells, and closing the top of the outer separating chamber and a lower diaphragm plate closing the lower end of the said separating chamber and providing with the inner shell a drainage opening serving the said outer chamber, and a plurality of baffle blades of arcuate cross-section disposed in spaced relation to each other in the outer separating chamber with their concave sides facing outwardly of the apparatus and extending the full length of the inlet openings in the outer shell, said blades each serving a separate opening and being secured to the outer shell on the upstream side and along the length of its respective opening and having its other longitudinal edge portion spaced radially from the portion of the outer shell defining the downstream extremity of the said inlet opening and defining with said outer shell portion a throat through which gases entering the separator must first flow.

5. Centrifugal separating apparatus comprising an outer cylindrical shell open at one end and closed at the other end and having elongated inlet openings extending axially of the shell, an inner cylindrical shell disposed coaxially in the outer shell and spaced radially therefrom and having a closed end and an open end directed toward the open end of the outer shell and having elongated inlet openings in its side wall terminating at substantial distances from the ends of the inner shell, and vortex control means comprising a hollow frusto-conical body disposed coaxially in the inner shell with its apex directed toward the closed end of the apparatus and a tubular support for the body extending coaxially through the closed end of the inner shell and having drainage openings to receive liquid collecting at the closed end of the said inner shell, said body having a base with a substantially monoplanar outer surface of diameter approximately one-half the inside diameter of the inner shell and disposed farther from the open end than from the closed end of the inner shell and between the ends of the inlet openings in said inner shell.

References Cited in the file of this patent

UNITED STATES PATENTS

| | | |
|---|---|---|
| 1,539,435 | Schultz | May 2, 1925 |
| 1,898,608 | Alexander | Feb. 21, 1933 |
| 1,917,606 | Sillers | July 11, 1933 |
| 2,256,524 | McKelvey | Sept. 23, 1941 |
| 2,489,903 | Kraft et al. | Nov. 29, 1949 |

UNITED STATES PATENT OFFICE

CERTIFICATE OF CORRECTION

Patent No. 2,929,465            March 22, 1960

Charles Langdon Campbell

It is hereby certified that error appears in the above numbered patent requiring correction and that the said Letters Patent should read as corrected below.

In the grant, line 2, and in the heading to the printed specification, line 4, address of the assignee, for "Columbus, Ohio", each occurrence, read -- Cleveland, Ohio --; column 6, line 44, for "longitudinally" read --tangentially--.

Signed and sealed this 23rd day of August 1960.

(SEAL)
Attest:

KARL H. AXLINE                      ROBERT C. WATSON
Attesting Officer                Commissioner of Patents